(12) United States Patent
Edelmann et al.

(10) Patent No.: US 9,194,479 B2
(45) Date of Patent: Nov. 24, 2015

(54) PIN FOR GUIDING A GEAR WHEEL, AND PLANETARY TRANSMISSION CONTAINING THE SAME

(71) Applicants: Ludwig Edelmann, Sulzthal (DE); Dominic Namyslo, Gädheim (DE)

(72) Inventors: Ludwig Edelmann, Sulzthal (DE); Dominic Namyslo, Gädheim (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/023,216

(22) Filed: Sep. 10, 2013

(65) Prior Publication Data

US 2014/0080658 A1   Mar. 20, 2014

(30) Foreign Application Priority Data

Sep. 10, 2012   (DE) .......................... 10 2012 216 001

(51) Int. Cl.
| | |
|---|---|
| *F16H 57/021* | (2012.01) |
| *F16H 57/08* | (2006.01) |
| *F16C 25/06* | (2006.01) |
| *F16C 33/58* | (2006.01) |
| *F16H 57/00* | (2012.01) |
| *F16H 57/022* | (2012.01) |
| *F16C 19/28* | (2006.01) |
| *F16C 19/48* | (2006.01) |

(52) U.S. Cl.
CPC .............. *F16H 57/021* (2013.01); *F16C 25/06* (2013.01); *F16C 33/581* (2013.01); *F16H 57/08* (2013.01); *F16C 19/28* (2013.01); *F16C 19/48* (2013.01); *F16C 2361/61* (2013.01); *F16H 57/0031* (2013.01); *F16H 2057/0221* (2013.01); *F16H 2057/085* (2013.01)

(58) Field of Classification Search
USPC .......................... 475/348; 384/903, 560, 561
See application file for complete search history.

(56) References Cited

U.S. PATENT DOCUMENTS

| | | | | |
|---|---|---|---|---|
| 997,573 | A | * | 7/1911 | Michaud ....................... 384/578 |
| 3,909,085 | A | * | 9/1975 | Wilkinson et al. ............ 384/517 |

(Continued)

FOREIGN PATENT DOCUMENTS

| | | |
|---|---|---|
| DE | 7418166 U | 5/1974 |
| DE | 2652652 A1 | 5/1978 |

(Continued)

OTHER PUBLICATIONS

English machine translation of DE 2652652 A1 (Helmer).*

(Continued)

*Primary Examiner* — Jacob S Scott
*Assistant Examiner* — Alberto Interian, III
(74) *Attorney, Agent, or Firm* — Bryan Peckjian; SKF USA Inc. Patent Dept.

(57) ABSTRACT

A pin for guiding a gear has a substantially cylindrical outer surface section, wherein the outer surface section comprises a substantially cylindrical rolling surface section, which is aligned and formed so as to make possible the guiding of the gear. The outer surface section further has a groove, which is formed so as to accommodate a retaining ring, wherein the groove is disposed with respect to the rolling surface section so as to make possible a guiding, directly or indirectly via the retaining ring, of a rolling-element assembly along the axial direction of the pin. In this way it is possible to provide a guiding of a gear wherein a small tolerance chain is implemented with respect to the axial position.

14 Claims, 3 Drawing Sheets

(56) References Cited

U.S. PATENT DOCUMENTS

| | | | | |
|---|---|---|---|---|
| 4,699,529 | A | * | 10/1987 | Scholl et al. .................. 384/560 |
| 5,122,099 | A | * | 6/1992 | Boedo et al. .................. 475/187 |
| 6,276,832 | B1 | * | 8/2001 | Wade, III ...................... 384/204 |
| 7,934,871 | B2 | * | 5/2011 | Kawaguchi et al. .......... 384/512 |
| 7,980,343 | B2 | * | 7/2011 | Mogi ............................ 180/65.6 |
| 8,282,523 | B2 | * | 10/2012 | Inayoshi ....................... 475/183 |
| 8,425,361 | B1 | * | 4/2013 | Beckner et al. ............... 475/159 |
| 2002/0117015 | A1 | * | 8/2002 | Greubel ........................ 74/89.44 |
| 2009/0247348 | A1 | * | 10/2009 | Haupt et al. .................. 475/159 |
| 2010/0215298 | A1 | * | 8/2010 | Zeidlhack ...................... 384/51 |
| 2010/0239205 | A1 | * | 9/2010 | Ohki et al. .................... 384/622 |

FOREIGN PATENT DOCUMENTS

| | | | |
|---|---|---|---|
| DE | 4136040 | C1 | 1/1993 |
| DE | 19926406 | A1 * | 12/2000 |
| DE | 102004009472 | A1 * | 9/2005 |
| DE | 202006014562 | U1 | 1/2007 |
| DE | 102007017138 | A1 | 10/2008 |
| DE | 102008000279 | A1 | 8/2009 |
| JP | 2002317864 | A | 10/2002 |
| WO | 20100131617 | A1 | 11/2010 |

OTHER PUBLICATIONS

English machine translation of WO 2010/131617 A1 (Ohno, et al).*
Machine translation of DE102004009472A1.*

* cited by examiner

PIN FOR GUIDING A GEAR WHEEL, AND PLANETARY TRANSMISSION CONTAINING THE SAME

CROSS-REFERENCE

This application claims priority to German patent application no. 10 2012 216.9 filed on Sep. 10, 2012, the contents of which are incorporated herein by reference.

TECHNICAL FIELD

The present invention relates generally to a pin for guiding a gear wheel, and to a planetary transmission.

RELATED ART

In many fields of machine-, systems-, and vehicle-engineering, gear wheels are used for transmitting rotational movements. These are used for example for providing a speed reduction or a speed increase as well as for direction changes or parallel displacements of corresponding rotational movements.

The gear wheels in this case are often rotatably supported with respect to other components of a corresponding machine, system, or vehicle. For this purpose, pins are used for example, which make possible an appropriate guiding of such a gear wheel. Planetary gears of a planetary transmission represent an example of this, which planetary gears are rotatably supported with respect to a planet carrier. In this case, the planet carrier is often itself designed as a rotatable component, while the planetary gears are in engagement with a sun gear and a ring gear. Of course, configurations other than the above-described are also used in the context of planetary transmissions.

Differentials and other corresponding components, such as for example wheel hubs of trucks and other commercial vehicles represent, besides automatic transmissions, an example for the use of a planetary transmission. In these, but also in other applications, the precision and achievable tolerance often represent an essential prerequisite for the functioning of the system concerned. Conventionally, components having larger tolerance chains are often used, which leads to a corresponding accumulation of tolerances of a plurality of individual tolerances of their individual parts, in order for example to define appropriate planetary gear wheels of a wheel hub unit with respect to its axial position. This can lead to function-critical tolerance accumulations, if for example a jamming or a binding of the respective gear wheel results due to a falling-below of the corresponding tolerances. Likewise, however, such a system can also have too much clearance due to an exceeding of the permissible tolerances. In order to thus be able to reliably stay within the tolerances in a conventional system, narrow individual tolerances must be worked with, which can lead to increased costs.

There is therefore a need to provide a guiding of a gear wheel, wherein a smaller tolerance chain is implemented with respect to the axial position.

SUMMARY

A pin according to an exemplary embodiment for guiding a gear wheel comprises a substantially cylindrical outer surface section, wherein the outer surface section comprises a substantially cylindrical rolling surface section, which is aligned and formed to make possible the guiding of the gear. The outer surface section further contains a groove which is formed to accommodate a retaining ring, wherein the groove is disposed with respect to the rolling surface section so as to make possible a guiding, directly or indirectly via the retaining ring, of a rolling-element assembly on the rolling surface section along an axial direction of the pin.

A pin according to an exemplary embodiment is thus based on the recognition that a shortening of the tolerance chain is achievable in that the pin has the groove in such a manner that it is disposed with respect to the rolling surface section precisely such that an axial alignment of one of the components rolling on the rolling surface section is indirectly or directly achievable via the retaining ring installable in the groove. In this case the outer surface section is designed substantially cylindrical, as well as the rolling surface section. Both, however, can for example comprise additional structures, as is further explained below in the context of the described exemplary embodiments. These structures can include, for example, outflow openings for supplying of lubricant, or other appropriate structures.

A pin according to an exemplary embodiment can optionally comprise the retaining ring as well as a thrust washer, wherein the thrust washer is in abutment with the retaining ring and is formed so as to at least partially limit a movement of the rolling-element assembly along the axial direction by coming-into-contact of the same with the thrust washer. In this case the retaining ring can of course be inserted into the groove. By the use of the thrust washer, which is fixed with respect to its position via the retaining ring, parts easily manufacturable with constructively simple means can thus be used, which can have a high tolerance with little expense. In this way the tolerance chain can be shortened using simple constructive measures.

In such a pin according to an exemplary embodiment, the thrust washer can optionally be disposed on a side of the groove facing away from the rolling-element assembly. In this way it can optionally be possible to fix the thrust washer in a housing or in another component, for example a planetary gear carrier, without a corresponding interference by the securing ring. Alternatively or additionally, it can be possible to thereby further shorten the tolerance chain, since a thickness of the thrust washer does not contribute to the tolerance chain.

A pin according to an exemplary embodiment can optionally have a shoulder which is disposed on a side of the rolling surface section facing away from the groove, and is formed so as to at least partially limit the movement of the rolling-element assembly along the axial direction by coming-into-contact of the same with the shoulder. In other words, in the case of such an implementation, the pin according to an exemplary embodiment has a shoulder facing away from the groove, by which shoulder the axial fixing of the respective components on the rolling surface section along the other direction is made possible. In this way a corresponding axial guiding along the other direction can be made possible using constructively simple means.

With a pin according to an exemplary embodiment, a clearance of the gear between the shoulder and the thrust washer can thus optionally be at least 0.2 mm and at most 0.8 mm.

A pin according to an exemplary embodiment can optionally further comprise a rolling-element assembly, which in turn comprises at least one row of rolling elements disposed around the axial direction of the pin, and a cage, wherein the cage is formed to guide the rolling elements in the axial and/or tangential direction. In other words, the pin according to an exemplary embodiment can likewise comprise the rolling elements and a cage, using which a corresponding bearing assembly can be realized. The cage can in this case optionally also be designed such that it guides the rolling elements in the radial direction or at least partially limits their movement. It can thus optionally be possible to omit an installation sleeve or other components for holding the rolling elements. The rolling elements can of course thereby be disposed and formed such that they roll on the rolling surface section of the outer surface section or can be in contact therewith.

In such a pin according to an exemplary embodiment, a cage can optionally be formed to guide the rolling-element assembly in the axial direction. In such a case, the cage can thus for example be axially guided via the retaining ring indirectly, for example via the thrust washer, or also directly. It can thereby optionally be possible to use rolling elements which in the axial direction have no tolerance or a tolerance of a low tolerance class.

In a pin according to an exemplary embodiment, the groove can optionally be covered by the cage with respect to at least 50% of a width of the groove. In other words, the groove and the optionally inserted retaining ring can be located completely or at least substantially within a width of the cage. The above-mentioned ratio can thus for example also be at least 60%, at least 70%, at least 80%, at least 90%, or even 100%. A more compact design and/or an adjustment of a clearance of the cage and thus of the rolling-element assembly can thereby optionally be realized. With a pin according to an exemplary embodiment, a clearance of the cage can thus optionally be at least 0.2 mm and at most 0.8 mm.

In a pin according to an exemplary embodiment, which pin comprises rolling elements and a cage, the rolling-element assembly can comprise a plurality of rows of rolling elements disposed around the axial direction of the pin. In such a case, the cage can be formed to guide the rolling elements of the plurality of rows in the axial and/or tangential direction. Of course, the rolling elements here can also in turn be formed and disposed such that they roll on the rolling surface section of the outer surface section or can be in contact therewith. By the use of the common cage for guiding the plurality of rows of rolling elements, it can optionally be possible to further simplify the assembly or production of a corresponding pin, since now only a single cage for guiding the rolling elements is to be installed.

In a pin according to an exemplary embodiment, which pin comprises rolling elements and a pin, the rolling elements can optionally comprise needle-shaped, cylindrical, roller-shaped, barrel-shaped, and/or ball-shaped rolling elements. Depending on the specific design, it can optionally be advisable here to implement needle-shaped, cylindrical, or roller-shaped rolling elements, wherein in the interest of a simple installation it can also optionally be interesting to use needle-shaped rolling elements, which have a larger ratio of axial length to diameter than cylindrical-shaped or roller-shaped rolling elements. In this way the number of the rolling elements to be installed, and thus the parts to be installed, can be reduced, which in turn can be reflected in a simplified installation of the pin.

In a pin according to an exemplary embodiment, which pin comprises rolling elements and a cage, the cage can comprise a metallic material and/or a plastic. All materials which comprise a metal and have a metallic behavior in the physical sense are viewed as a "metallic material" herein. These therefore include, for example, pure metals, alloys, however also metals or alloys which comprise non-metallic components. All polymers which are suitable for guiding rolling elements are generally viewed as "plastics". These include, for example, plastics suitable for injection molding, wherein it can of course optionally be advisable to match and/or to accordingly select the plastic in question to the environmental conditions prevailing during use. Solid metal cages, plate cages with or without seam, i.e. also seamless plate cages, as well as injection-molded cages and hybrid cages, which comprise both metallic materials and plastic components, can be used as cages.

An exemplary embodiment furthermore comprises a planetary transmission including a plurality of planetary gears, wherein the planetary gears of the plurality of planetary gears are each guided on a planet carrier by a pin according to an exemplary embodiment. Optionally the planetary gears can in this case have a corresponding counter-raceway on which the rolling elements roll or with which they are in contact.

Two objects are "adjacent" herein if no further object of the same type is disposed between them. Objects are "directly adjacent" if they adjoin or abut one another, i.e. they are in contact with one another. A "one-piece component" is understood to mean a component that is manufactured from one continuous piece of material. The term "one-piece" can therefore be used synonymously with the terms "integral" or "one-part." A "mechanical coupling" of two components comprises both a direct and an indirect coupling.

A component is seamless here if this has no seam along a closed path in a predetermined direction, for example an axial direction or an axis of symmetry, at which the component is connected to itself or another component by an appropriate connecting technology, for example a material-bond connection technology, and here in particular by a welding, soldering, or adhesive bonding.

Despite the word component "direction," in the present case each individual "direction" is not necessarily a direction in the mathematical sense of a vector, but rather a line along which the corresponding movement occurs. Such a line can be straight, but can also be curved. To be distinguished here are directions which are actually directions along a line, for example the direction of movement. Thus for example a first direction can oppose a second direction, but both may extend or be oriented along a line which is also designated as a direction.

A component can, for example, have an n-fold rotational symmetry, where n is an integer greater than or equal to 2. An n-fold rotational symmetry exists if the component in question can be rotated about an axis of rotation or symmetry by $(360°/n)$ and still look the same, i.e. upon a corresponding rotation it is substantially mapped onto itself in the mathematical sense. In contrast, with a completely rotationally symmetric embodiment of a component, with any turn of any angular extent about the axis of rotation or symmetry, the shape of the component remains the same, i.e. is substantially mapped to itself in the mathematical sense. Both n-fold rotational symmetry and full rotational symmetry are referred to herein as rotational symmetry.

As used herein, a "friction-fit" connection results from static friction, a "materially-bonded" connection results from molecular or atomic interactions and forces, and an "interference-fit" connection results from a geometric connection of the respective connection partners. The static friction in particular presupposes a normal force component between the two connecting partners.

Exemplary embodiments are described and explained in more detail below with reference to the accompanying Figures.

DETAILED DESCRIPTION OF THE INVENTION

Figure 1:
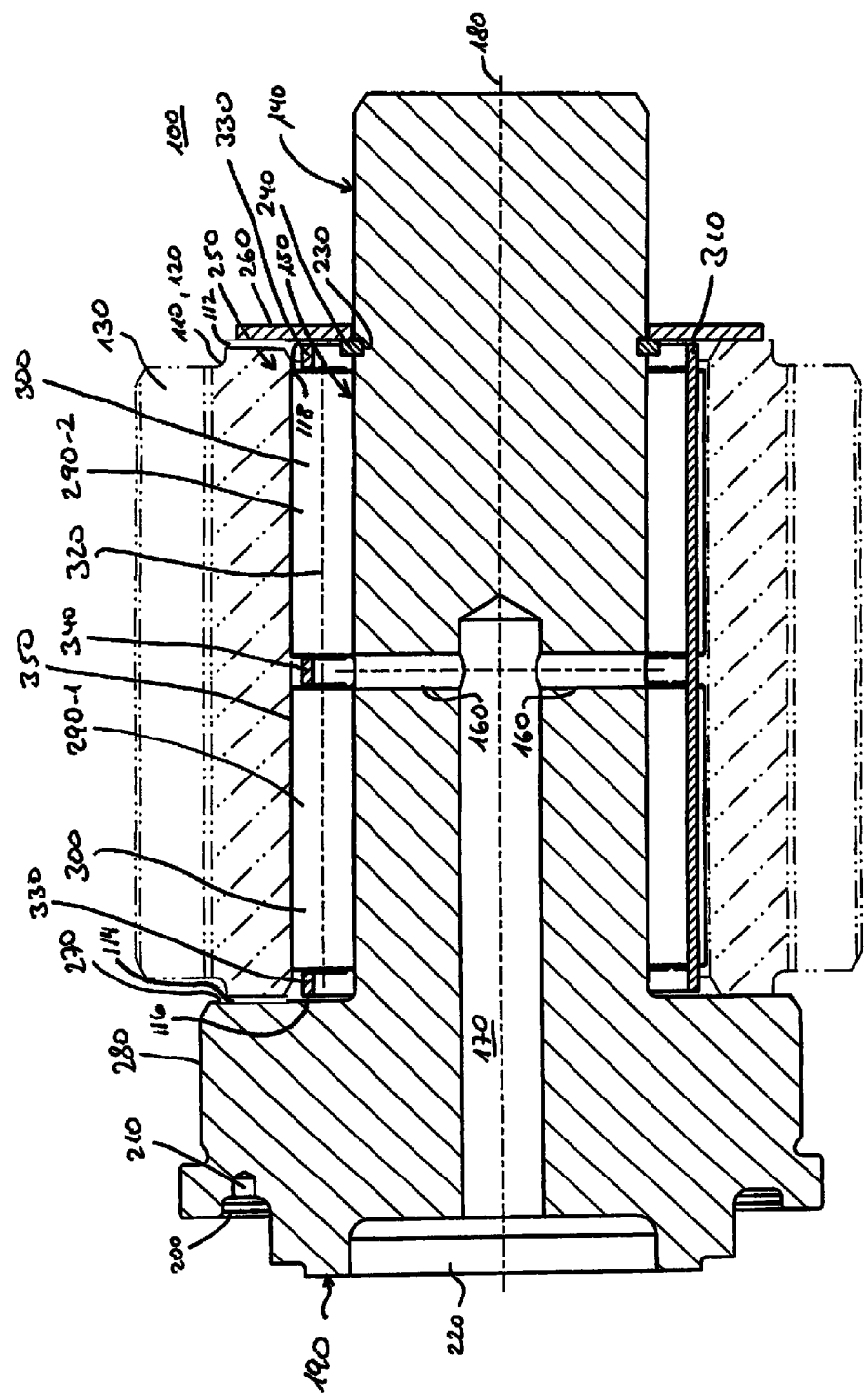
FIG. 1 shows a cross-sectional view through a pin according to an exemplary embodiment.

In the following description of the accompanying illustrations, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

FIG. 1 shows a cross-sectional view through a pin 100, according to an exemplary embodiment, for guiding a gear wheel 110, wherein it is more specifically a planetary gear 120 of a planetary transmission. Accordingly, the gear wheel 110 has a plurality of gear flanks 130, which can be in engagement with complementary other gear wheels. However, to simplify the illustration, the respective other gear wheels are not shown in FIG. 1.

The pin 100 has a substantially cylindrical outer surface section 140, which differs in essence from a perfectly cylindrical outer surface section in that it has further structures as are described below. The outer surface section 140 thus has a rolling surface section 150 which is also substantially cylindrically designed, which is precisely aligned and formed so as to make possible the guiding of the gear wheel 110. The rolling surface section 150 is also only substantially cylindrically designed and comprises further structures as are also described below.

Both the outer surface section 140 and the rolling surface section 150 thus contain one or more outflow channels 160, via which the rolling surface section 150 can be supplied with a lubricant starting from a central bore 170 in the pin 100. The outflow channels here are substantially perpendicular to the central bore 170 and an axial direction 180 of the pin 100. In other words, in the exemplary embodiment shown here the outlet channels 160 extend substantially in the radial direction. In the exemplary embodiment shown in FIG. 1, they are furthermore embodied in the form of a through-bore through the pin 100, wherein the pin 100 in the exemplary embodiment shown here comprises precisely the two shown outflow channels 160. Of course, in other exemplary embodiments, correspondingly more and/or fewer outflow channels can be implemented, which also can be disposed differently, independent of their number. These can for example be embodied in the form of blind bores, which end in the central bore 170, without fully penetrating through the pin 100.

In order to make possible an alignment of the outflow channels 160, the pin 100 shown in FIG. 1 has an alignment bore 210 in the region of the end side 190 in a encircling groove 200. The alignment bore 210 thereby corresponds, with respect to its angle of rotation around the axial direction 180, which also represents an axis of symmetry of the pin 100, to the angle of at least one of the outflow channels 160. It can for example thereby also be possible to align the pin 100 such that lubricant which has entered into the central bore 170 is conveyed or transported due to centrifugal forces through the respective outflow channel 160 to the rolling surface section 150.

In order to make possible an appropriate inflow of the lubricant, which can for example be an oil from an oil sump, the central bore 170 opens in an opening 220 disposed end-sided 190.

The pin 100 further contains a groove 230 in the outer surface section 140, which is precisely formed so as to accommodate a retaining ring 240. The groove 230 and the retaining ring 240 are now precisely disposed on the rolling surface section 150 so that a rolling-element assembly 250 can be guided by this, indirectly or directly, along the axial direction. For this purpose, the pin 100 further has a thrust washer 260 which is in abutment with the retaining ring 240 on a side facing away from the groove 230. The thrust washer 260 is now precisely dimensioned so that the rolling-element assembly 250 can come into contact with it and is accordingly at least partially limited with respect to its movement along the axial direction 180. In addition, the thrust washer 260 likewise serves to guide the gear wheel 110, which can also come into contact, via a corresponding lateral surface, with the thrust washer 260. Clearances 112, 114 are disposed between the thrust washer 260 and the gear wheel 110. The thrust washer 260 is fixed adjacent to the retaining ring 240 along the other direction of the axial direction 180 by a housing not shown in FIG. 1, which can for example be a part of the planet carrier.

For axially fixing the gear wheel 110 as well as the rolling-element assembly 250, the pin 100 further has a shoulder 270, which is disposed on a side, facing away from the groove 230, of the pin 100. The shoulder 270 is formed by a transition region 280 that has a diameter, which is greater than that of the outer surface section 140. In the exemplary embodiment shown here, the shoulder 270 extends substantially along the radial direction, however in other exemplary embodiments it can also be directed at a slightly inclined angle. The gear wheel 110 and the rolling-element assembly 250 thus also come into contact with the shoulder 270 and are thereby guided along the axial direction 180 with respect to the other direction.

In the exemplary embodiment shown here, the rolling-element assembly 250 comprises a plurality of rows 290 of rolling elements 300, which in the exemplary embodiment shown here are more specifically needle-shaped rolling elements 300. In the exemplary embodiment shown here, the rolling-element assembly 250 includes, even more specifically, two rows 290-1, 290-2 of rolling elements 300, wherein however a higher or a lower number of rows 290 of appropriate rolling elements 300 can be implemented in other exemplary embodiments.

Furthermore, the rolling-element assembly 250 comprises a cage 310, which in the present case is in a position to guide the rolling elements 300 of all rows 290 in the axial direction 180 and in the tangential direction, i.e. the circumferential direction around the pin 100. Of course, in other exemplary embodiments, the cage 310 can also be designed for not providing guidance in the axial or tangential direction.

The cage 310 has a diameter which lies outside a centerline 320, which represents the axis of rotation of the rolling elements 300. In the exemplary embodiment shown here, the cage 310 is also in a position to guide the rolling elements 300 along the circumferential direction; thus, it has corresponding openings, through which the rolling elements 300 can protrude. The openings, which are also referred to as pockets, thereby have an extension in the circumferential direction, i.e. along the tangential direction, which is smaller than the diameter or the rolling elements 300, so that the cage 310 can also secure the rolling elements 300 against falling-out in the radial direction. In other words, it can thus also at least partially guide the rolling elements 300 in the radial direction, or limit their movement along the radial direction. In this way it can optionally be possible to omit additional installation sleeves or similar constructions for installing the pin 100 or for installing the rolling element assembly 250 on the pin 100. Of course, a corresponding radial guidance of the cage 310 can optionally be omitted in other exemplary embodiments. Clearances 116, 118 are disposed between the cage 310 and the shoulder 270 and thrust washer 260.

Figure 3:
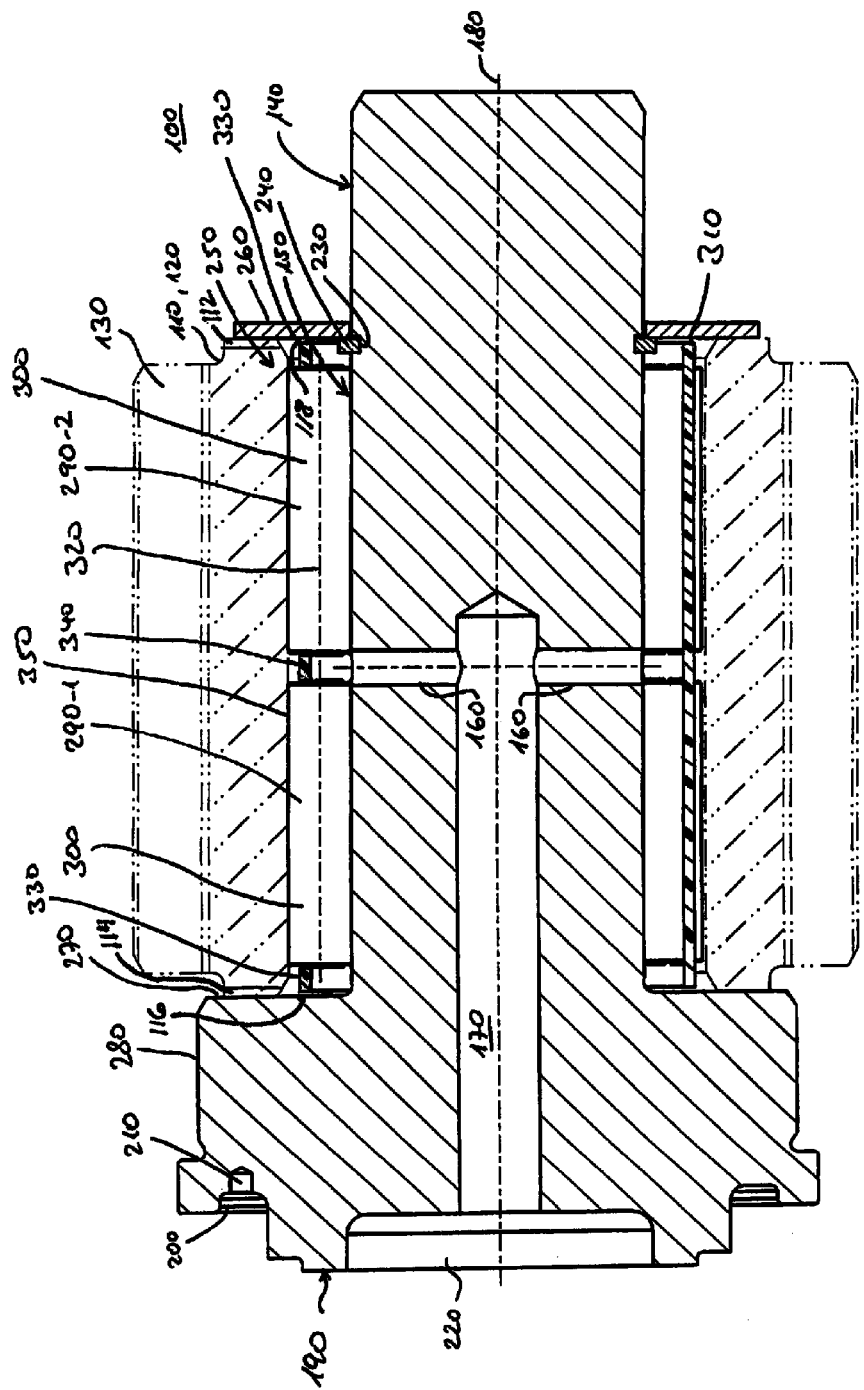
FIG. 3 shows a cross-sectional view through a pin according to a separate embodiment.

In this case the cage 310 can in principle be manufactured from different materials. Thus the cage 310 can for example comprise a metallic material and/or a plastic, i.e. for example it can be realized as a solid metal cage, as a plate cage with or without a seam, but also as an injection-molded part or as a hybrid cage having both metallic materials and a plastic. In one embodiment, a metal cage is illustrated in FIG. 1 and in an alternative embodiment a plastic cage is illustrated in FIG. 3.

In the exemplary embodiment shown here, the cage 310 is furthermore precisely formed such that it undertakes the axial guiding of the rolling-element assembly 250 and thus can come into contact with the thrust washer 260 and the shoulder 270. For this purpose, the cage 310 has an overhang 330 on each of the two sides of the rows 290 of rolling elements 300, which overhang 330 extends farther in the axial direction towards the shoulder 270 or towards the thrust washer 260 than the corresponding rolling elements 300 of the respective row 290. The thrust washer 260 and the shoulder 270 thus come into contact with the respective overhangs 330 of the cage 310.

Furthermore, the cage 310 comprises a central section 340, which is disposed between the rows 290 of rolling elements 300 and precisely matches, with respect to its position, the outlet of the outflow channel 160, so that a lubricant exiting from the outflow channel 160 can reach the rolling surface section 150, and thus the rolling elements 300, unimpeded. Simply for the sake of completeness, it should also be mentioned at this point that the gear wheel 110 of course also has a counter-raceway 350 corresponding to the rolling surface section 150, which is in contact with the rows 290 of the rolling elements 300 and thus makes possible a rolling of these between the gear wheel 110 and the pin 100. In the exemplary embodiment shown in FIG. 1, a retaining ring 240, which can for example be a snap ring, is then therefore inserted into the groove 230 of the pin 100 which is also referred to as "pin."

The cage 310—and thus the rolling-element assembly 250—as well as the gear wheel 110 can have a clearance, due to an interaction with the shoulder 270 and/or the thrust washer 260, which falls for example between 0.2 mm and 0.8 mm. Of course, in other exemplary embodiments other values can also be adopted. Thus the groove 230 and the retaining ring 240 can be located for example completely or at least predominantly within the cage width.

Figure 2:
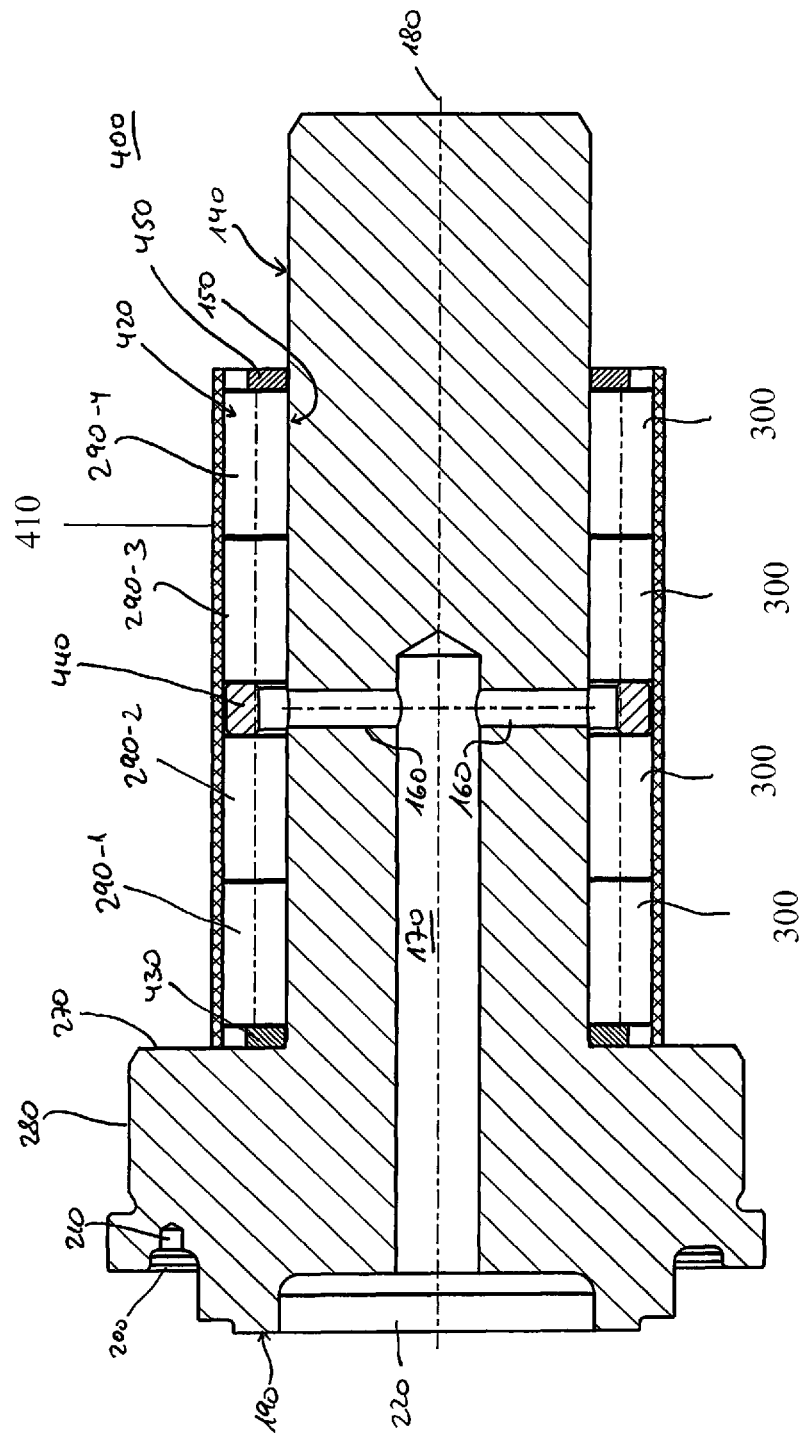
FIG. 2 shows a cross-sectional view through a conventional pin.

In order to make possible a better comparison with a conventional pin, FIG. 2 shows a conventional pin 400, wherein for simplification of the illustration, no gear wheel is shown. In its place, FIG. 2 instead shows an installation sleeve 410, using which an assembly 420 of rolling elements 300 is held in the radial direction, which assembly 420 differs significantly from the rolling-element assembly 250 of the pin 100 according to an exemplary embodiment.

Apart from the difference with respect to the assembly 420 of the rolling elements 300 to the rolling-element assembly 250 of the pin 100 from FIG. 1, the conventional pin 100 differs with respect to the outer surface section 140 in that it has precisely no groove 230, into which the retaining ring 240 is insertable. With regard to the design of the shoulder 270, of the transition region 280, and of the channels for the supplying of lubricant (opening 220, central bore 170, outflow channel 160, and alignment bore 210), the conventional pin 400 does not, however, differ from the pin 100 from FIG. 1.

The assembly 420 of the rolling elements 300, however, differs greatly from that of the pin 100 from FIG. 1. While the already-above-mentioned reduction of the tolerance chain in the pin 100 due to the provision of the groove 230, as well as the inserting of the retaining ring 240 and the bringing-into-contact of the thrust washer 260 on the side of the groove 230 facing away from the rolling-element bearing assembly, has resulted in that the tolerance chain in the present exemplary embodiment is substantially only determined by the tolerance of the position of the groove 230 as well as the thickness of the retaining ring, the axial position of the assembly 420 in the assembly shown in FIG. 2 is determined by a plurality, more specifically by a tolerance chain, which extends over 7 components altogether.

Thus the assembly 420 first includes a first spacer 430 which is in direct abutment with the shoulder 270. A first row 290-1 of rolling elements 300, which are cylindrical rollers, connects to the spacer 430. A second row 290-2 of rolling elements 300 connects directly to the first row 290-1 of the rolling elements 300, which second row 290-2 is in abutment with a center spacer 440. This is in contact with a third row 290-3 of rolling elements 300 on a side facing away from the second row 290-2, which row 290-3 is in turn in contact with a fourth row 290-4 of rolling elements 300. A second spacer 450 connects to the fourth row 290-4 of rolling elements 300, which spacer 450, in the installed state, can come into contact with the thrust washer 260.

Due to this very complex assembly 420 of the rolling elements, the tolerance chain thus extends over the altogether seven individual components or their individual tolerances. The tolerance chain is thus given as the sum of the individual tolerances of the tolerance of the position of the shoulder 270 with respect to the pin 400, which in turn is also referred to as "pin," as well as the tolerance of the first spacer 430, which is also referred to as "spacer." The tolerances of the altogether four rows 290-1, . . . , 290-4 of the rolling elements 300, which are also referred to as "rollers," as well as the center spacer 440, which also referred to as "spacer," are added. Depending on the specific implementation, even the tolerance of the second spacer 450, which is also referred to as "spacer," can likewise additionally provide a contribution to the tolerance chain. Under unfavorable conditions, the tolerance chain can thus be given by the tolerances of the individual parts of the position of the shoulder 270 with respect to the pin 400, altogether three spacers 430, 440, 450, and the four rows 290 of the cylindrical rollers 300. With the pin 400 shown in FIG. 2, cylindrical rollers are moreover typically used, since these are ground on the end sides and thus have a narrower length tolerance than, for example, the typically unground needles.

The total tolerance of the pin 400, as is shown in FIG. 2, is thus given as the sum of the individual tolerances of altogether 7 or 8 components. If one adopts, for example, a tolerance of 0.18 mm, at this point it is advisable, possibly even necessary, to use expensive cylindrical rollers instead of needle rollers, in order to maintain the total tolerance required. This can be expensive independent therefrom, since the position of the shoulder 270 with respect to the pin 400 must also be fabricated with an appropriate tolerance.

In contrast thereto, with a pin 100 according to an exemplary embodiment, the conventional unit designed as full complement is replaced by a cage type. This makes it possible to ensure the axial position of the cage 310 by the snap- or retaining-ring 240 and the thrust washer 260. In addition, the conventional improvements by the use of a cage 310 can also be realized, which can include for example a lower friction but also a simpler installation of the rolling-element assembly 250 on the pin 100, since the cage 310, as it has been embodied, is designed such that this can also hold the needles or rolling elements 300. The spacing of the snap ring groove (groove 230) determines the axial position of the planetary gear 120 (gear wheel 110) for the pin 100, and thus the required or available axial clearance. In comparison to the conventional solution, the tolerance chain is thus lesser, whereby loosened tolerances and thus optionally also cost savings are achievable, as well as an increased reliability can optionally be ensured.

In the pin 100 shown in FIG. 1, the total tolerance can be formed for example from only two components, namely the position of the groove 230 and the tolerance of the retaining ring 240, wherein the manufacture can already be simplified in that, for example, the discs provided for the retaining ring 240 and the thrust washer 260 are already commercially available with tolerances of 0.02 mm each. Starting from the above-mentioned total tolerance of 0.18 mm, a tolerance of 0.16 mm or 0.14 mm remains for the position of the groove 230 in the pin 100. This often represents a relatively simple and thus inexpensive implementation in terms of manufacturing technology.

Such a cage retainer, for example for a planetary gear bearing arrangement, can thus optionally be manufactured more inexpensively. The functional reliability can also optionally be increased by the achievable tolerance reduction, since fewer components are involved. Likewise, an exchangeability can optionally be facilitated or improved, and a simpler installation can be implemented.

The use of an exemplary embodiment can thus make it possible to provide a guiding of a gear wheel 110, wherein a smaller tolerance chain is implemented with respect to the axial position.

As has already been explained more than once, exemplary embodiments can for example be used in the commercial vehicle field, for example for trucks in the field of a planetary bearing assembly of a wheel hub. Exemplary embodiments are however far from limited to this application field, but rather can in principle be used in all fields wherein, for example, planetary transmissions or also other gears are to be guided.

REFERENCE NUMBER LIST

100 Pin
110 Gear wheel
120 Planetary gear
130 Gear flank
140 Outer surface section
150 Rolling surface section
160 Outflow channel
170 Central bore
180 Axial direction
190 End side
200 Encircling groove
210 Alignment bore
220 Opening
230 Groove
240 Retaining ring
250 Rolling element assembly
260 Thrust washer
270 Shoulder
280 Transition region
290 Row
300 Rolling elements
310 Cage
320 Centerline
330 Overhang
340 Central section
350 Counter-raceway
400 Pin
410 Installation sleeve
420 Assembly
430 First spacer
440 Center spacer
450 Second spacer

The invention claimed is:

1. A gear assembly, comprising:
a pin having an outer surface section with a rolling surface section over which a gear wheel is positioned, the pin having a shoulder delimiting a first axial end of the rolling surface section and oriented perpendicular to an axial axis of the pin;
the gear wheel being positioned adjacently to the shoulder without another component, aside from a possible clearance, of the gear assembly disposed therebetween such that the shoulder is configured to axially guide the gear wheel,
a rolling element assembly disposed between the rolling surface section and the gear wheel, the rolling element assembly including a cage,
wherein the outer surface section further contains a groove, which is formed in order to accommodate a retaining ring located therein, the retaining ring delimiting a second axial end of the rolling surface section, and
the groove is disposed with respect to the rolling surface section so as to make possible a guiding directly, or indirectly via the retaining ring, of the rolling-element assembly on the rolling surface section along an axial direction of the pin, and
a thrust washer disposed on a side of the retaining ring opposite from the gear wheel, wherein the cage of the rolling element assembly can abut against the thrust washer, the cage can abut against the shoulder of the pin, wherein the thrust washer axially guides the gear wheel.

2. The gear assembly according to claim 1, wherein the thrust washer is disposed on a side of the groove that is opposite of the rolling-element assembly.

3. The gear assembly according to claim 1, the shoulder being disposed on an end side of the rolling surface section opposite of the groove and formed so as to at least partially limit movement of the rolling-element assembly along the axial direction by contacting the shoulder.

4. The gear assembly according to claim 3, wherein the gear wheel has a clearance between the shoulder and the thrust washer that is at least 0.2 mm and at most 0.8 mm.

5. The gear assembly according to claim 1, further comprising the rolling-element assembly, further comprising:
at least a first row of rolling elements disposed around a circumferential direction of the pin and
the cage being configured to guide the rolling elements in the axial direction and/or in a tangential direction.

6. The gear assembly according to claim 5, wherein the cage is formed so as to guide the rolling-element assembly in at least the axial direction.

7. The gear assembly according to claim 6, wherein at least 50% of a width of the groove is covered by the cage.

8. The gear assembly according to claim 7, wherein the cage has a clearance with the retaining ring that is at least 0.2 mm and at most 0.8 mm.

9. The gear assembly according to claim 8, wherein the rolling-element assembly further comprises:
- at least a second row of rolling elements disposed around the circumferential direction of the pin and axially adjacent to the first row of rolling elements, and
- wherein the cage guide the rolling elements of both the first and second rows in the axial direction and/or in the tangential direction.

10. The gear assembly according to claim 9, wherein the cage comprises a metallic material and/or a plastic.

11. The gear assembly according to claim 2, the shoulder being disposed on an end side of the rolling surface section opposite of the groove and formed so as to at least partially limit movement of the rolling-element assembly along the axial by contacting the shoulder.

12. The gear assembly according to claim 3, further comprising the rolling-element assembly, which in turn comprises:
- at least a first row of rolling elements disposed around a circumferential direction of the pin and
- the cage being configured to guide the rolling elements in the axial direction and/or in a tangential direction.

13. A gear assembly, comprising:
- a pin having an outer surface section with a rolling surface section over which a gear wheel is positioned, the pin having a shoulder delimiting an axial end of the rolling surface section and oriented perpendicular to an axial axis of the pin;
- the gear wheel being positioned adjacently to the shoulder without another component, aside from a possible clearance, of the gear assembly disposed therebetween such that the shoulder is configured to axially guide the gear wheel,
- a rolling element assembly disposed between the rolling surface section and the gear wheel, the rolling element assembly including a cage which abuts against the shoulder of the pin,
- wherein the outer surface section further contains a groove, which is formed in order to accommodate a retaining ring located therein, the retaining ring delimiting a second axial end of the rolling surface section,
- the groove is disposed with respect to the rolling surface section so as to make possible a guiding directly, or indirectly via the retaining ring, of the rolling-element assembly on the rolling surface section along an axial direction of the pin,
- a thrust washer, wherein the thrust washer is in abutment with the retaining ring on a side thereof opposite from the shoulder of the pin, movement of the rolling-element assembly along the axial direction is at least partially limited by contacting the thrust washer, wherein the cage of the rolling element assembly can abut against the thrust washer, the cage can abut against the shoulder of the pin, the thrust washer being configured to axially guide the gear wheel,
- the rolling-element assembly further comprising at least a first row of rolling elements disposed around a circumferential direction of the pin and
- the cage being configured to guide the rolling elements in the axial direction and/or in a tangential direction,
- wherein the rolling-element assembly further comprises:
- at least a second row of rolling elements disposed around the circumferential direction of the pin and axially adjacent to the first row of rolling elements, and
- the cage guides the rolling elements of both the first and second rows in the axial direction and/or in the tangential direction, and
- the cage further comprises a central section disposed between the first row of rolling elements and the second row of rolling elements, creating a gap radially aligned with a lubricant outflow channel.

14. A gear assembly, comprising:
- a pin having an outer surface section with a rolling surface section over which a gear wheel is positioned, the pin having a shoulder delimiting an axial end of the rolling surface section and oriented perpendicular to an axial axis of the pin;
- the gear wheel being positioned adjacently to the shoulder without another component, other than a possible clearance, of the gear assembly disposed therebetween such that the shoulder is configured to axially guide the gear wheel,
- a rolling element assembly disposed between the rolling surface section and the gear wheel, the rolling element assembly including a cage which abuts against the shoulder of the pin,
- wherein the outer surface section further contains a groove, which is formed in order to accommodate a retaining ring located therein, the retaining ring delimiting a second axial end of the rolling surface section,
- the groove is disposed with respect to the rolling surface section so as to make possible a guiding directly, or indirectly via the retaining ring, of the rolling-element assembly on the rolling surface section along an axial direction of the pin,
- a thrust washer, wherein the thrust washer is in abutment with the retaining ring on a side opposite from the shoulder of the pin, and is formed so as to at least partially limit movement of the rolling-element assembly along the axial direction by contacting the thrust washer, wherein the cage of the rolling element assembly can abut against the thrust washer, the cage can abut against the shoulder of the pin, the thrust washer axially guides the gear wheel,
- the rolling-element assembly further comprising at least a first row of rolling elements disposed around a circumferential direction of the pin and
- the cage being configured to guide the rolling elements in the axial direction and/or in a tangential direction,
- the cage further comprises a central section disposed between the first row of rolling elements and the second row of rolling elements, creating a gap radially aligned with a lubricant outflow channel, and
- wherein the rolling-element assembly further comprises:
- at least a second row of rolling elements disposed around the circumferential direction of the pin and axially adjacent to the first row of rolling elements, and
- wherein the cage further comprises a first overhang abutting the shoulder and a second overhang abutting the thrust washer, the cage guiding the rolling elements of both the first and second rows in the axial direction and/or in the tangential direction.

* * * * *